No. 892,751. PATENTED JULY 7, 1908.
A. T. LUECKENBACH.
COOKING UTENSIL.
APPLICATION FILED APR. 26, 1907.

WITNESSES:
C. M. Albee.
L. A. Nichlas.

INVENTOR
Anton T. Lueckenbach.
BY
G. H. Albee.
ATTORNEY

UNITED STATES PATENT OFFICE.

ANTON T. LUECKENBACH, OF NEENAH, WISCONSIN.

COOKING UTENSIL.

No. 892,751.   Specification of Letters Patent.   Patented July 7, 1908.

Application filed April 26, 1907. Serial No. 370,456.

*To all whom it may concern:*

Be it known that I, ANTON T. LUECKENBACH, a citizen of the United States, and a resident of Neenah, in the county of Winnebago and State of Wisconsin, have invented a new and useful Improvement in Cooking Utensils.

My invention relates to a device for removing odors from a vessel in which food is being cooked, and conveying it away and downward through the same kettle hole in a cooking stove or range over which the vessel holding the food being cooked is supported.

The objects of my improvement are, to provide a device that is easy to use, is effectual and will occupy only the same kettle hole in a stove or range which the vessel the food being cooked in uses for obtaining its heat. I attain these objects by the construction shown in the accompanying drawing, in which,—

Figure 1:
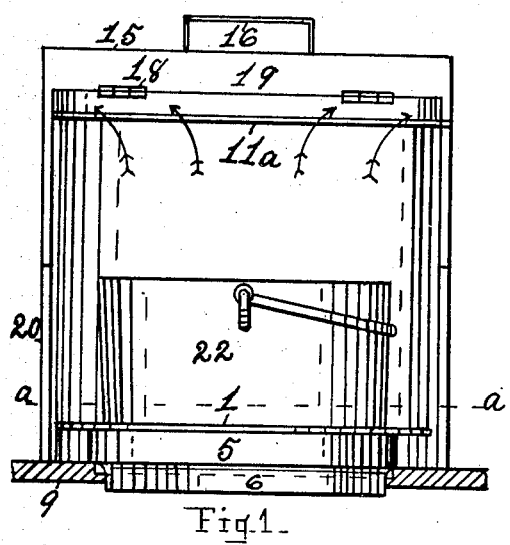
Figure 2:
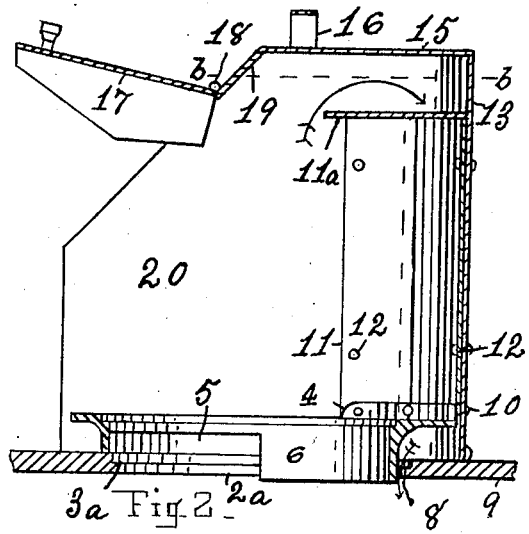
Figure 3:
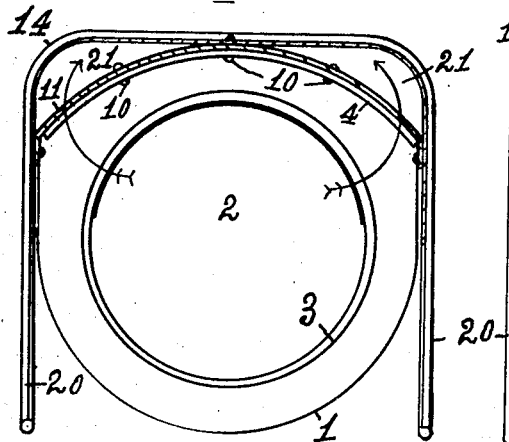
Figure 4:
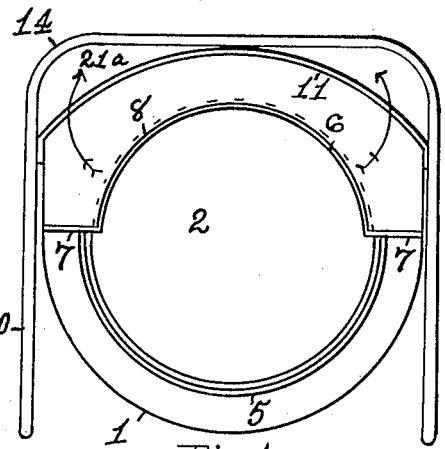
Figure 5:
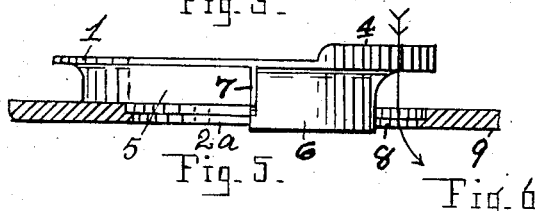
Figure 6:
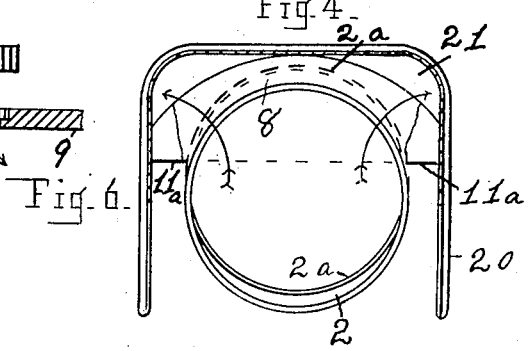

Figure 1 is a front elevation of the device, (its lid being removed), mounted upon a stove or range top which is in section, a cooking vessel being in position on the plate under the hood. Fig. 2 is a vertical section through the center of Fig. 1, the vessel thereon being omitted, showing its lid partly raised. Fig. 3 is a plan of the device below the line $a, a,$ of Fig. 1, the vessel thereon being removed. Fig. 4 is a plan of Fig. 3 as it appears turned bottom side upward. Fig. 5 is a side elevation of the flat upper faced casting upon a kettle hole of a stove or range top, which top is in section. Fig. 6 is a sectional plan upon a reduced scale, on the line $b, b,$ of Fig. 2, (with its lid removed), of the device placed over a kettle hole of a stove or range, eccentrically with it.

Similar numerals and letters indicate like parts in the several views.

The device consists of a metallic casting having a flat upper surface horizontally arranged and having a kettle hole centrally of it, two flanges of different lengths and curvatures depending from its lower side and one of a lesser curve extending upward from the upper side of its rear edge, to which a curved sheet metal plate is secured in a vertical position, and to which curved plate a hood having a lid hinged to it is secured, the hood inclosing the aforesaid casting.

1, indicates a plate, flat upon its upper surface, formed of cast metal, having a kettle hole 2, corresponding in diameter with the diameter of the kettle hole $2^a$, in the cooking stove or range with which the device is to be used. This plate has also an annular rabbet 3, for receiving the stove lid, a rising flange 4, a semi-annular drop flange 5 for the support of the plate upon the stove top, and a semi-annular deflector flange 6, extending through the hole $2^a$ and below the stove or range top, and wings 7. The diameter of the flange 5 upon its inside corresponds with the outside diameter of the rabbet $3^a$, of the stove or range, and the outside diameter of the deflector flange 6, nearly corresponds with the diameter of the kettle hole $2^a$, but is a little less, and upon its inside, slants inward sufficiently for convenience in casting, as shown in Fig. 3. The inside circle of the flanges 5 and 6 being different, the plate when placed over a kettle hole in a stove or range with its inside of the flange 5 even with the outside of said kettle hole rabbet, $3^a$, allows the deflector flange 6 to enter the kettle hole quite loosely, and when the plate is moved forward on the stove or range, (which it can do an inch or more), to leave a space 8, through which any steam or odors can pass in their course from the cooking vessel to the combustion space of a stove or range, under its top 9.

Extending upward from the flange 4 and secured to it with bolts or rivets 10, is a sheet metal plate 11, and attached to it with bolts or rivets 12, is a hood 13, having vertical sides and back and rounded corners 14, a flat top 15, a handle 16, and a lid 17, hinged at 18 to the slanting part of the top 19. The front edges of the sides 20, are slanted from the top piece 19 about half way down the height of the hood, the lid being arranged to close said space and to assume positions in and outside of the hood, either side of a vertical plane passing through its hinges.

The hood is open from the lid downward to its bottom for admitting a supply of air and thereby creating a draft across the top of the cooking vessel. Between the plate 11 and rounded corners 14 of the hood, are flues 21, into which steam and odors from the cooking vessel 22, can enter over the top of the plate 11 and pass downward, emerge from the bottom $21^a$ of the flues, and pass into the combustion chamber of the stove or range through the space 8 around the flange 6. The arrows in the several figures indicate the direction in which the steam travels in passing from the cooking vessel through the hood and its bottom plate 1. Upon the top of the plate 11, a shelf, 11ª, is fixed, extending forward over the cooking vessel a small distance, for receiving the steam and odors from said vessel and directing them into the flues, the front edge of the shelf being broken away in Fig. 6 as shown in dotted lines. The circle upon which the deflector flange 6, is formed being smaller than the inside diameter of the rabbet of the kettle hole in the stove or range, allows the plate to be moved forward as shown in Figs. 5 and 6, and leave a space at the rear of the flange 6 through which steam and odors can pass to the combustion space, and a space of less area through the kettle hole of the stove or range, than when said plate is placed directly over the kettle hole, as in Fig. 2. By means of said moving of the plate 1, the heat under the vessel and the degree of down draft through the flues can be governed to suit existing conditions. It will be observed that only one kettle hole is required in using this device, while with many devices for the purpose, two are required, one for the cooking vessel and another for conveying the steam and odors to the combustion space, and also, that vessels of different capacity can be used within the hood, and furthermore, by simply moving the plate horizontally, different degrees of heat can be supplied to the vessel and of down draft through the flues.

Having described my invention, what I claim and desire to secure by Letters Patent, is,—

1. In an odor removing device, in combination with a stove top containing a pot hole therein, a hood resting on said top, a plate contained in said hood resting on said top, over said hole and adapted to support a cooking utensil.

2. In an odor removing device, in combination with a stove top containing a hole therein, a hood resting on said top and over said hole and having an opening therein concentric with, and of the same diameter as said stove hole.

3. In an odor removing device, in combination with a stove top containing a pot hole, a hood, a plate positioned above said hole, said plate having a depending flange extending into said pot hole.

4. In an odor removing device, in combination with a stove top containing a pot hole, a plate positioned above said hole, a hood extending upward from said plate, said plate having a depending flange extending into said pot hole and being adapted for a limited horizontal movement within said pot hole.

5. In an odor removing device, in combination with a stove top containing a pot hole therein, a hood resting on said top, a plate contained in said hood, resting on said top, over said hole and adapted to support a cooking utensil, a plate rising vertically within and across the rear side of said hood from the first named plate, and a flue extending downward from the top of said vertical plate between it and the rear side of said hood and through the first named plate.

Signed at Neenah, in the county of Winnebago and State of Wisconsin.

ANTON T. LUECKENBACH.

Witnesses:
H. G. BROWN,
S. B. MORGAN.